E. EVERSON.
GRAIN DRILL.
APPLICATION FILED NOV. 12, 1914.
1,169,945.
Patented Feb. 1, 1916.
2 SHEETS—SHEET 2.
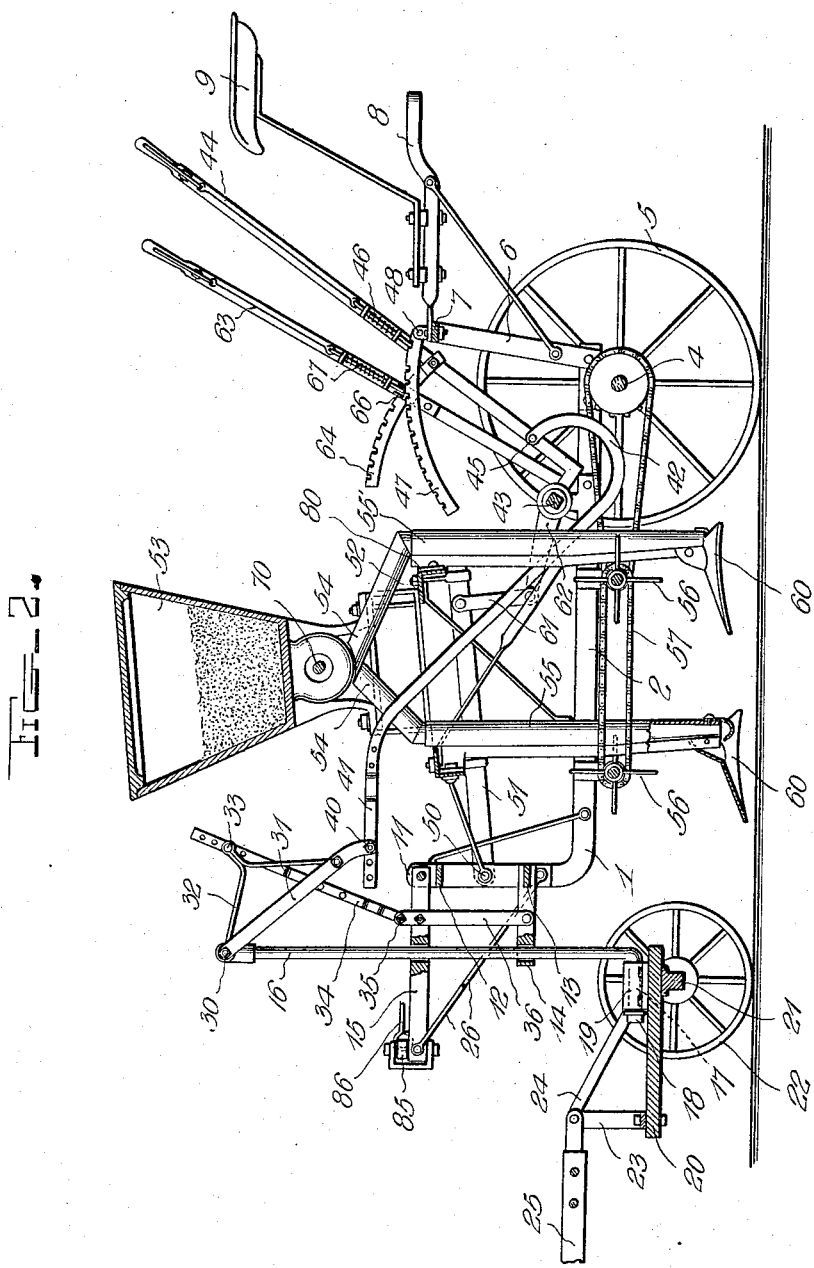
Witnesses
C. Munker
Roland T. Booth
Inventor
Edwin Everson
By H. B. Willson & Co.
Attorneys

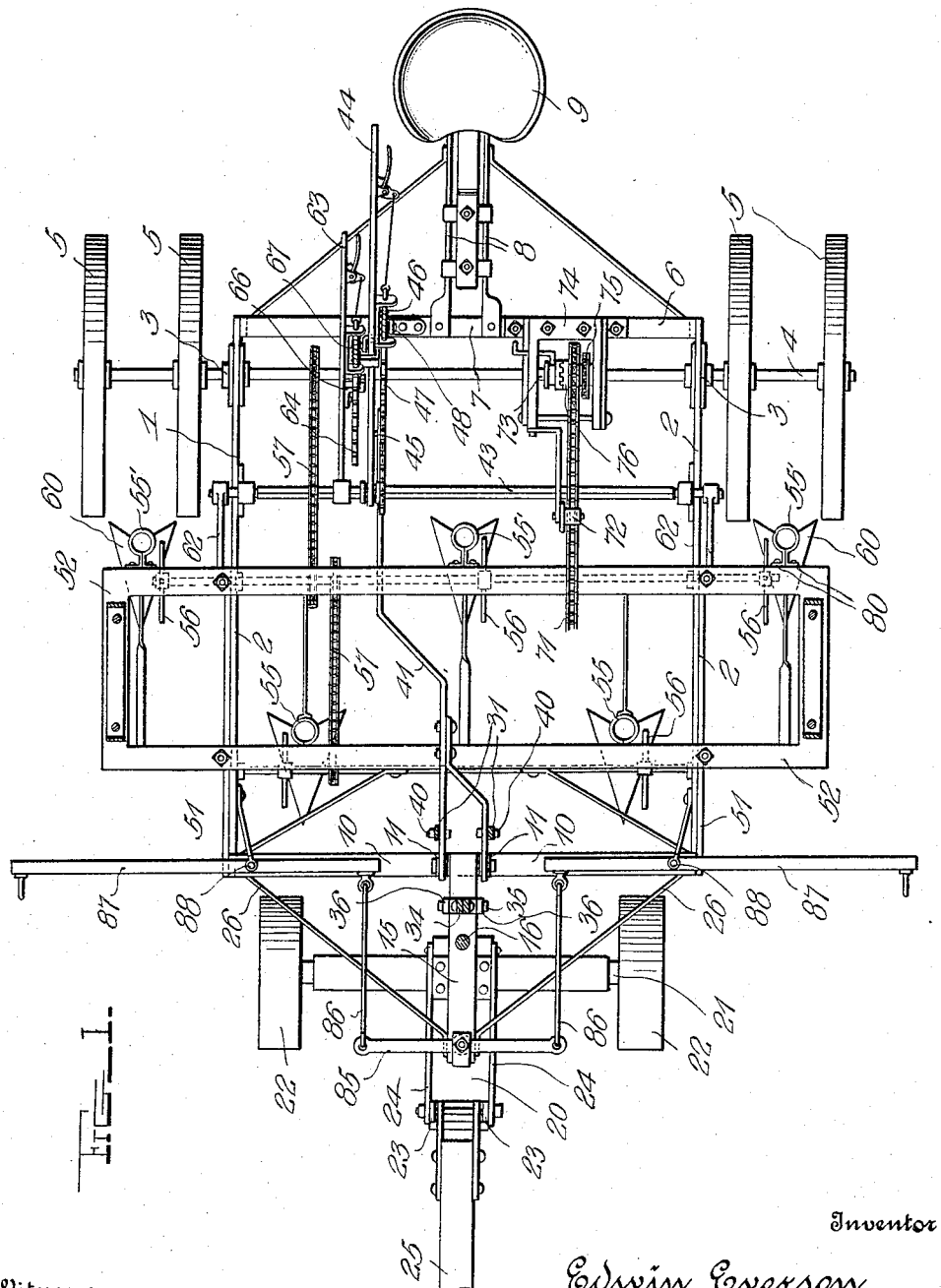

UNITED STATES PATENT OFFICE.

EDWIN EVERSON, OF ALMA, NEBRASKA.

GRAIN-DRILL.

1,169,945.  Specification of Letters Patent.  Patented Feb. 1, 1916.

Application filed November 12, 1914. Serial No. 871,728.

*To all whom it may concern:*

Be it known that I, EDWIN EVERSON, a citizen of the United States, residing at Alma, in the county of Harlan and State of Nebraska, have invented certain new and useful Improvements in Grain-Drills; and I do declare the following to be a full, clear, and exact description of the invention, such as will enable others skilled in the art to which it appertains to make and use the same.

My invention relates broadly to improvements in agricultural implements and more particularly to grain drills primarily designed for planting wheat.

In the improved machine, a main wheel supported frame is provided, said frame being mounted for vertical adjustment, a supplemental tool carrying frame is mounted for vertical adjustment on the main frame, and a pair of levers are provided for adjusting the two frames independently of each other.

One object of the invention is to provide a connection between these two levers, whereby the same may be actuated simultaneously after the proper adjustments are made.

Another object is to improve upon the general construction of seeders of the class described to such an extent as to provide a machine which will not only be comparatively simple and inexpensive, but which will be highly efficient and durable.

With the above and minor objects in view, the invention resides in certain novel features of construction and combination herein described and claimed and shown in the drawings wherein:—

Figure 1 is a top plan view thereof; Fig. 2 is a central vertical longitudinal section.

In the embodiment illustrated in the accompanying drawings forming part of this application, the numeral 1 designates a main supporting frame which comprises a pair of L-shaped side bars 2 whose rear ends are secured to bearings 3 in which a rear axle 4 revolves, the opposite ends of said axle being secured to pairs of wheels 5. The rear ends of the bars 2 are connected by an arched frame 6 from whose cross bar 7, a pair of braced seat supporting bars 8 extend rearwardly, a seat 9 being adjustably mounted on said bars.

As most clearly seen in Fig. 1, the upper ends of the upright arms of the side bars 2, are bent laterally inward as seen at 10 and then upward to provide a pair of spaced ears 11. Secured beneath the portions 10, is a transverse reinforcing bar 12, while directly beneath said bar 12 is a second transverse bar 13. Secured to and extending forwardly from the bar 13, is a longitudinal bar 14 whose forward end is provided with an upright bearing opening, while a second longitudinal bar 15 has its rear end secured between the ears 11 and is likewise provided with a bearing opening located directly above the opening in the bar 14. It will be noted that the bar 15 extends a considerable distance in advance of its bearing opening, this provision being made for the attachment of a draft device to be described.

The alined bearing openings in the bars 14 and 15, receive an upright standard 16 whose lower end is bent forwardly as seen at 17 and provided with a stop 18, a longitudinal bearing 19 being loosely mounted on the portion 17 and being carried by a forwardly projecting bar 20 having its rear end secured to a comparatively short front axle 21 whose opposite ends are supported by appropriate wheels 22. Rising from the front end of the bar 20 is a pair of short standards 23 which are braced as seen at 24 and pivotally connected to the rear end of an appropriate tongue 25. It may here be stated that the bar 15 is likewise provided with inclined brace rods 26 as shown.

Swiveled at 30 to the upper end of the standard 16, is a lever 31 which is composed of a pair of parallel bars from which a pair of inverted V-shaped members 32 rise, the upper ends of the latter being adjustably and pivotally connected at 33 with the forked upper end of a link 34 which depends between the side bars of the lever 31 and whose lower end is likewise forked and pivoted at 35 to the upper ends of a pair of links 36. It will be seen by reference to Figs. 1 and 6, that these links 36 are secured to the lower bar 14 and to the upper bar 15, thereby rigidly connecting the two in such a manner as to prevent vibration.

The lever 31 inclines downwardly and rearwardly from its swiveled forward end and is adjustably and pivotally connected at 40 to the forked forward end of a link 41 whose intermediate portion inclines downwardly and rearwardly, while its rear end is curved upwardly and forwardly as seen at 42 beneath a transverse rock shaft 43 to which the lower end of a main operating lever 44 is loosely fulcrumed, said rear end of the link 41 being pivoted at 45 to said lever. By this construction, movement of the lever 44 rearwardly will raise the lever 31, thereby raising the link 34 and the entire front of the main frame 1, during which movement, this frame swings around the rear axle 4 as a pivot. Movement of the lever 44 forwardly, however, will release the lever 31 thus allowing the frame 1 to lower.

For the purpose of locking the lever 44 in any one of its adjusted positions, a pawl 46 and a segmental rack bar 47 are provided, the former engaging the teeth of the latter, the rack bar being pivoted at 48 to the transverse bar 7 of the frame 6. By thus mounting the rack bar, various inaccuracies in constructing the machine are compensated for, since the rack is moved around its pivot, by the adjustment of the lever 44, the necessary amount to allow the pawl 46 to engage the teeth of said rack, at all times.

Pivoted at 50 to the upright forward ends of the side bars 2, is a pair of longitudinal side bars 51 to which a transverse supplemental or hopper frame 52 is secured, the latter being of rectangular formation and supporting a suitable seed hopper 53 from which a plurality of discharge tubes 54 diverge downwardly, these tubes extending alternately toward the front and toward the rear of the machine. The lower ends of the front tubes 54 communicate with a transverse series of spaced upright delivery tubes 55 which are secured to the front transverse bar of the frame 52, and which depend from said bar. The rearmost tubes 54 communicate with the upper ends of a transverse series of spaced upright delivery tubes 55' whose upper ends are secured to the rear transverse bar of the frame 52, and which are disposed in staggered relation in respect to the tubes 55. By this construction, the tubes 55 and 55' may be spaced transversely to an extent great enough to allow rubbish to pass between the same when the machine is in operation in stubble land.

For the purpose of facilitating the rearward movement of such trash and rubbish between the various upright tubes, a plurality of cleaning devices in the form of pronged wheels 56, are provided, one of said wheels being located adjacent each of the tubes. By this means, when the wheels 56 are rotated by a chain 57 or other means, from the rear axle, they will positively prevent any accumulation in advance of the tubes. These wheels 56 may be of the style shown, or of other formation for performing their functions. The lower ends of the tubes 55 and 55' are provided with shovels 60 of any desired shape.

For the purpose of raising and lowering the hopper or supplemental frame 52, and the parts carried thereby, two links 61 are pivoted to and depends from the rear ends of the bars 51, said links having their lower ends pivoted to arms 62 which project forwardly from and are rigidly secured to the rock shaft 43, said shaft being equipped with a lever 63 whereby it may be rocked in order to raise and lower the frame 52. As hereinbefore suggested, it becomes expedient to provide means whereby the levers 63 and 44 may be locked together after the necessary adjustments of the two frames 1 and 52 have been made. It also becomes expedient to employ means for locking the lever 63 in any one of its adjusted positions. For accomplishing the two purposes, a segmental rack bar 64 is pivoted at its rear end to the lever 44 and is passed through a guide 66 on the lever 63, the latter being equipped with a pawl 67 coacting with the teeth of said rack bar. By this means, the lever 63 may be adjusted independently of the lever 44, but is locked thereto when the pawl 67 is projected as will be readily understood. Actuation of the main lever 44 will now operate the lever 63, thus raising or lowering the frames 1 and 52 simultaneously.

For the purpose of rotating the shaft 70 which discharges seed from the hopper 53 into the tubes 54, a chain 71 equipped with a tightener 72 is provided, said chain being driven from a transverse shaft 73 which is mounted in a U-frame 74 above the arched frame 6 as shown. The shaft 73 is driven by a chain 75 from the rear axle 4. It may be here explained, that the gear on the shaft 73 around which the chain 72 passes, may be locked to rotate with the shaft 73 or may be released from its connection therewith, by an appropriate form of clutch 76, (see Fig. 1). It will be understood that the tubes 55 and 55' might well be secured to the frame 52 in any suitable manner, but the upper ends of said tubes are preferably provided with attaching ears 80 for this purpose, as shown in the various figures of the drawings.

The hereinbefore mentioned draft mechanism includes a lever 85 which is pivoted between its ends upon the forward end of the bar 15, a pair of links 86 which project rearwardly from the ends of the lever 85, and a pair of transverse alined levers 87 which are pivoted between their ends at 88 to the outer ends of the inturned portions 10 of the side bars as shown in Figs. 2 and 6. To these levers 87, the usual swingle or double trees (not shown) may be connected in the usual manner. A draft device constructed as above described, is particularly adaptable for use in connection with a machine of the class described, although its use need not be limited to this application.

From the foregoing description, taken in connection with the accompanying drawings, it will be seen that a comparatively simple machine has been provided for carrying out the objects of the invention, yet that the efficiency of the device will not be impaired by such simplicity.

I claim:—

1. An implement comprising a plurality of supporting wheels, a vertically adjustable main frame supported thereon, a vertically adjustable supplemental frame mounted on the main frame, a lever for adjusting one frame, a second lever for adjusting the other frame, releasable means for locking one lever against movement, and an adjustable connection between the two levers.

2. An implement comprising a plurality of supporting wheels, a vertically adjustable main frame supported thereon, a vertically adjustable supplemental frame mounted on the main frame, a lever for adjusting one frame, a second lever for adjusting the other frame, releasable means for locking one lever against movement, a rack bar connected to one of said levers, a guide on the other lever through which the bar slides, and a pawl for locking the bar against movement in the guide.

3. An implement comprising a main portable frame, mechanism for adjusting such frame vertically, an auxiliary tool-carrying frame mounted on the main frame, additional mechanism for adjusting said auxiliary frame vertically with respect to the main frame, and means for connecting the two mechanisms, whereby movement imparted to one will be imparted to the other.

4. An implement comprising a main portable frame, an auxiliary tool-carrying frame mounted on said main frame, a lever for adjusting the main frame vertically, a second lever for adjusting the supplemental frame with respect to said main frame, and means whereby the two levers may be connected to move in unison.

5. An implement comprising front and rear wheels, an upright standard supported by the front wheels, a main frame having its rear end supported by the rear wheels and having at its front end a bearing slidable vertically on the standard, a downwardly and rearwardly inclining lever pivoted to the upper end of the standard, a link pivoted to the intermediate portion of said lever and to a part of the frame, a transverse rock shaft carried by the frame, a hand lever fulcrumed adjacent said rock shaft, a link connecting the lower end of the first named lever with the hand lever, an auxiliary tool-carrying frame mounted for vertical adjustment on the main frame, a crank arm extending from the rock shaft and connected with said auxiliary frame, an additional hand lever secured to said rock shaft and disposed adjacent the other hand lever, means for connecting the two levers for movement in unison, and releasable means for normally preventing movement of one of said levers.

6. An implement comprising a front wheel supported axle, a standard secured to and rising therefrom, a longitudinal horizontal bar having a bearing mounted to slide on said standard, said bar being adapted for the attachment of a draft device, a transverse bar secured to the rear end of the longitudinal bar, L-shaped side bars having their upright arms secured to the ends of the transverse bar, wheels supporting the rear ends of the side bars, braces extending from the side bars to the front ends of the longitudinal bar, a second transverse bar beneath the first, a second longitudinal bar projecting forwardly from the second transverse bar and having a bearing mounted to slide on the standard, and means for raising the bearings on the standard.

In testimony whereof I have hereunto set my hand in presence of two subscribing witnesses.

EDWIN EVERSON.

Witnesses:
JOHN G. HEALEY,
ELDEN G. PORTER.

Copies of this patent may be obtained for five cents each, by addressing the "Commissioner of Patents, Washington, D. C."